United States Patent [19]

Behrendt

[11] 4,448,376

[45] May 15, 1984

[54] HOLDER FOR AN ELECTRICAL COMPONENT

[75] Inventor: Martin Behrendt, Hagen, Fed. Rep. of Germany

[73] Assignee: Wickmann-Werke AG, Witten-Annen, Fed. Rep. of Germany

[21] Appl. No.: 299,636

[22] Filed: Sep. 4, 1981

[30] Foreign Application Priority Data

Nov. 1, 1980 [DE] Fed. Rep. of Germany ....... 3041610

[51] Int. Cl.$^3$ ................................................ G12B 9/00
[52] U.S. Cl. ....................................... 248/27.3; 248/56
[58] Field of Search ...................... 248/27.1, 27.3, 56; 200/296; 339/126 R, 128; 174/48

[56] References Cited

U.S. PATENT DOCUMENTS

| | | | |
|---|---|---|---|
| 2,076,043 | 4/1937 | Ryder | 248/27.1 X |
| 2,610,012 | 9/1952 | Mackey et al. | 248/27.3 |
| 2,800,698 | 7/1957 | Wood | 248/27.3 X |
| 3,024,336 | 3/1962 | Trafton | 200/296 X |
| 3,366,727 | 1/1968 | Rueger | 248/27.1 X |
| 4,252,288 | 2/1981 | Behrendt | 248/27.1 |

*Primary Examiner*—J. Franklin Foss
*Attorney, Agent, or Firm*—Robert E. Burns; Emmanuel J. Lobato; Bruce L. Adams

[57] ABSTRACT

A holder (1) with a cylindrical housing (4) for an electrical component is arranged to be secured to a mounting panel of thickness (d) by pushing the housing through an opening in the panel until a flange (3) engages the panel. The housing is surrounded by a clamping collar (6) providing groups of strip springs (8) of different length. The springs are provided with oblique end edges (7) and are twisted outwardly so as to center the holder in the mounting panel opening and to engage the back of the panel around the opening.

12 Claims, 4 Drawing Figures

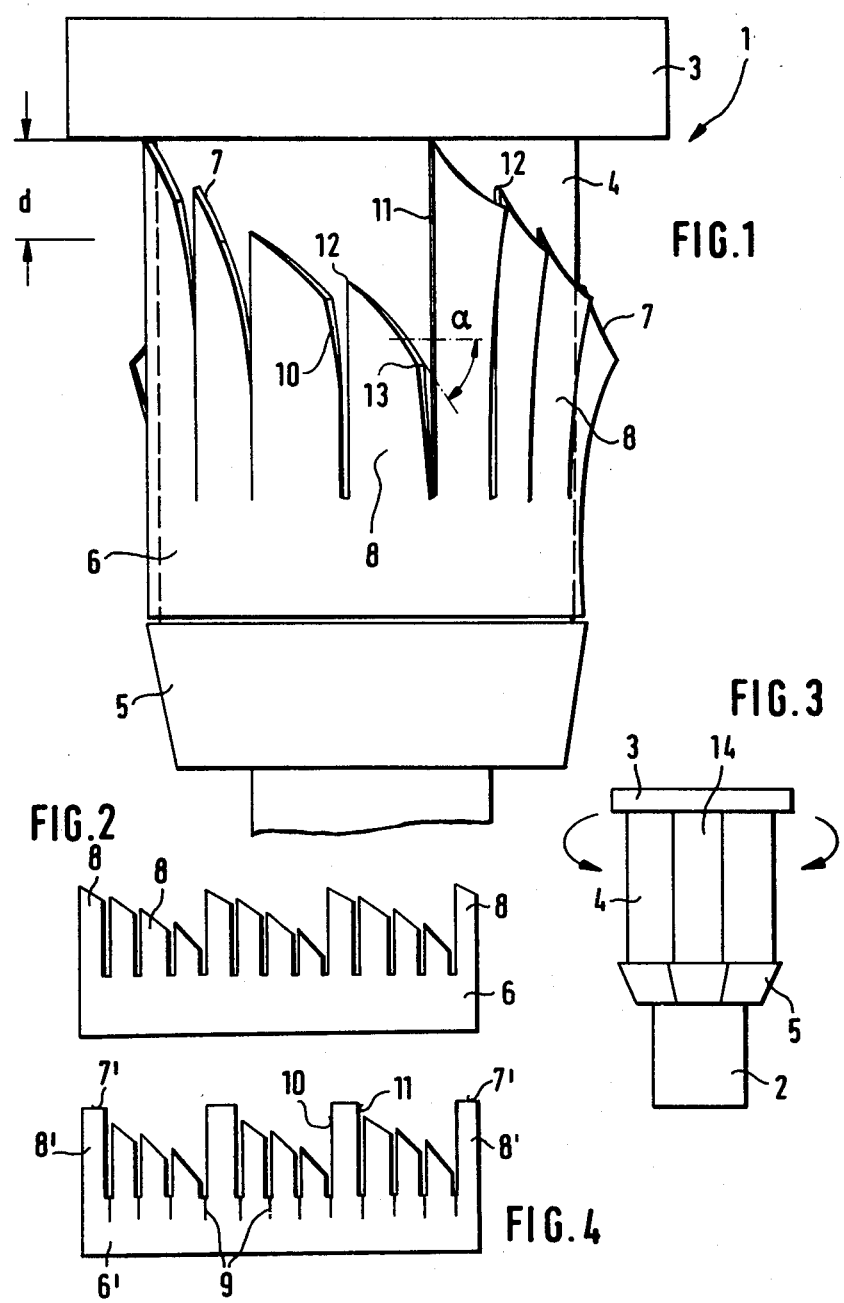

HOLDER FOR AN ELECTRICAL COMPONENT

The invention refers to a holder for an electrical component the fixing of which can be effected by once-only plugging of the holder into an opening in a mounting panel, the holder comprising a housing which has a substantially cylindrical outer face carrying a resilient clamping part the diameter of which will, in use, exceed in part the inner diameter of the opening, and which is arranged to be pushed through the opening whereupon an edge of the clamping part running obliquely to a generatrix of the cylindrical outer face engages behind the mounting panel. Such a holder is hereinafter referred to as of the kind described.

Holders of that kind have long been known and are used, e.g., for holding indicator lamps or fuses. Furthermore the same kind of fixing has also already been proposed for cable lead-ins through a partition (British Patent Specification No. 1,128,227).

The principle of such fixings depends upon the fact that a resilient clamping part, or a region of this part, upon plugging into the opening, adapts itself temporarily by elastic deformation to the narrower internal diameter of the opening, and after being plugged through the opening springs out again behind the corresponding mounting wall. Moreover an edge standing out obliquely engages behind the mounting wall so that the clamping point between the oblique edge and the rear edge of the opening depends upon the thickness of the mounting wall. When fluctuations in the thickness of the mounting wall are not expected, instead of the oblique edge, a grading like a flight of steps may be provided so that for any thickness of mounting wall a predetermined step engages behind the corresponding opening.

As the material for the resilient clamping part, the basic material of the holder is usually used, that is, e.g., a relatively hard, tough and electrically insulating plastics material, but it has also already been proposed to produce the resilient clamping part out of spring sheet metal (West German OS No. 2640951). Because of the greater hardness and the easier processing the employment of spring steel metal has in general succeeded.

Independently of the choice of the material the known holders, depending upon their construction, exhibit disadvantages. In the case of the clamping part which engages behind the mounting wall in step form, only positive locking is achieved in each case. This certainly prevents slipping of the holder out of the mounting wall but does not guarantee almost immovable seating within the opening. If on the contrary, the region of the clamping part which engages behind is provided with an edge running obliquely, the oblique edge for covering the usual spectrum of thickness for the mounting wall must be only slightly sloped. That has the result that in particular in the case of comparatively narrow openings and thick mounting panels the engagement occurs only incompletely, whereby the danger exists of the holder unintentionally slipping out of the opening again as soon as slight pull is applied. A further disadvantage of the slight slope of the oblique edge lies in the fact that the effect of the engagement occurs only after an additional movement of the holder transversely to its longitudinal axis, i.e. after the plugging-in of the holder a waggling movement of the holder is still necessary for securing the engagement.

It is accordingly an object of the invention to provide a holder of the kind described which, in spite of considerable dimensional fluctuations in the thickness of the mounting panel, guarantees a firm seating solely through the plugging-in process.

According to the invention, the clamping part is formed as a collar having a plurality of strip springs extending axially along the outer face and terminating at ends which provide the oblique edges and which are located at different axial positions along the outer face, the strip springs being twisted so that one side edge of a strip spring extends substantially parallel to a generatrix of the cylindrical outer face and the other side edge is displaced away from the outer face.

With this construction, there are a plurality of individual springs which are each individually twisted. This produces a family of springs which allows a particularly sharply inclined obliquity of the edge which engages behind the mounting panel. The slope with respect to the generatrices of the cylindrical outer face may amount to, e.g. 45°.

Because of the outwardly directed prestress of each strip spring, there is achieved very good centering, especially in the case of openings having a large overdimension. Also, the sharp obliquity of the spring which is engaging the panel at any time assists springing back a long way, so that satisfactory fixing of the holder after plugging-in is achieved as a result of the spreading effect as the strip spring passes through the opening.

Because of this very good securement of the holder resulting from the steep slope of the oblique edge engaging behind the opening, it is advantageous to align the length of the individual springs in such a way that when standard mounting panels are used, at least one strip spring engages by its oblique edge behind the opening. In order to guarantee these conditions even in the case of wide fluctuations in the dimension of the thickness of the standard mounting panel, it is proposed that the strip springs are combined into groups with the axial lengths of the strip springs in each group successively decreasing around the outer face; and, of two adjacent strip springs in a group, the distal end of the oblique edge of the shorter strip spring lies axially beyond the proximal end of the oblique edge of the longer strip spring. In this way it is ensured that at least one spring of each group engages only in part behind the corresponding opening in the mounting panel and thus by means of the sharp obliquity achieves a good clamping effect. If, furthermore, three groups are distributed around the circumference of the spring collar, a three point grip of the holder is achieved, which is a particularly favorable arrangement.

By means of the invention it is, for the first time, possible to cover a particularly wide spectrum of mounting panel thickness. For the nominal thicknesses of 0.75, 1.00, 1.20, 1.50, 1.80, 2.20, 2.50, and 3.00 mm four springs within one group are sufficient, in which case each spring covers two thicknesses of the mounting panel. Since the increment between adjacent nominal thicknesses becomes larger with increasing thickness, it is advantageous to choose the obliquity of the oblique edge which is engaging behind the respective opening, to be greater with decreasing spring length. Thus while the longest spring is provided, for example, with an obliquity of 40° with respect to the radial plane of the holder, the shortest spring exhibits an obliquity of, for example, 55°.

Examples of holders constructed in accordance with the invention are illustrated in the accompanying drawings, in which:

FIG. 1 is a side elevation on an enlarged scale;

FIG. 2 is a development of the spring collar of the holder of FIG. 1;

FIG. 3 is a side elevation of the holder having a D-face without the spring collar; and, FIG. 4 is a view similar to FIG. 2 but showing a modified spring collar.

The holder 1 illustrated in FIG. 1 is plugged with its shank 2 foremost through an opening in a mounting panel until the underside of a flange 3 rests against the surface of the mounting panel (not shown). A shoulder 5 is connected to the shank 2, and between the shoulder and the underside of the flange 3 extends an essentially cylindrical outer face 4. The latter serves for receiving resilient clamping means in the form of a spring collar 6 which embraces the outer face 4 essentially without play between the shoulder 5 and the flange 3.

The spring collar 6 consists of three groups each of four single strip springs 8, which in the circumferential direction exhibit a constant incrementally decreasing spring length. At the top free end of each spring there is an oblique edge 7, which runs downwards at an angle to the generatrices of the outer face 4 and furthermore adopts an outwardly directed position. In this way the end edge of each spring 8 exhibits a distal end 12 and a proximal end 13. The spread position of the proximal end 13 is brought about by twisting out the associated side edge 10 away from the outer face 4. The other side edge 11 associated with the distal end 12 runs approximately in parallel with the associated generatrix of the outer face 4.

In the case of the illustrated examples, the distal end 12 of a shorter spring 8 is positioned beyond the proximal end 13 of the adjacent longer spring. If, for example, the mounting panel exhibits a thickness d, the rear panel edge around the associated opening for receiving the holder 1 is engaged both by the right hand middle spring of each group and also by the left hand middle spring, while the longest spring does not reach the rear edge of the opening and the shortest spring does not come into contact with the opening at all. Because the end edges of the adjacent springs overlap one another, a positive connection in the form of only one spring engaging completely behind the rear edge of the opening is avoided. On the contrary, in each case the lower region of the oblique edge 7 of the adjacent longer spring 8 likewise participates in the fixing. It is thereby ensured that the holder 1 is held not only positively but consequently also with a force fit in the axial direction within the corresponding opening in the mounting panel.

Between the individual strip springs 8 there is provided in each case a gap in the form, for example, of a piece stamped out, which guarantees the mobility of the springs 8 and thereby certain operation during the engaging process. Furthermore the cut outs may be carried further by means of slits 9, whereby the springs become altogether softer. Thus if for the corresponding application springs with a hard spring characteristic are needed no slits 9 are provided in prolongation of the cut outs.

In FIG. 2 the development of a spring collar 6 is illustrated. It contains three and a quarter groups of four strip springs 8 each, the distribution being so chosen that long springs 8 lie at the outer boundaries in each case. This development may be produced, e.g., as a stamped part with subsequent bending out of the springs 8 and shaping into an approximately annular structure, which is then pushed over the slightly conical shoulder 5 from below on to the holder of FIG. 3. Care is taken that the two lateral long springs 8 get positioned directly beside a D-face 14 the level of which, standing proud of the cylindrical outer face 4, ensures that the spring collar 6 is secured against twisting with respect to the holder 1. Instead of the D-face 14 a rib may also be provided, running axially along the holder 1. Both forms serve for securing the holder 1 against twisting as a whole in a correspondingly shaped opening within the mounting panel.

In FIG. 4 a further example of the spring collar 6' is illustrated. In this case the longest springs of a group are provided, instead of with an oblique end edge 7, with an end edge 7' which runs at right angles to the respective side edges 10 and 11. The lengths of the associated springs 8' are so chosen that they rest without play against the underside of the flange 3. In the upper region these springs 8' are bent slightly outwards so that upon plugging the holder 1 into an opening within a mounting-panel they bring about a centering of the holder. This centering action is an additional measure, since the holder 1, because of the spread out proximal end edge ends 13 of the springs 8, already experiences very good centreing. In the case of this construction, care is to be taken that the mounting panel has a thickness which amounts at least to the distance from the end edge 7' to the center of the oblique edge 7 of the next shorter spring 8.

It has proved that the satisfactory action of the springs 8 is achieved inter alia because of their small width in the direction circumferential to the cylindrical outer face 4 and the relatively sharp spreading out of the proximal edge ends 13 in each case. Angles $\alpha$ of spread of a maximum of about 45° are useful, measured in plan between the spread out upper part of the spring 8 and the tangent to the associated generatrix of the outer face 4, that is, say, that generatrix which runs close to the side edge 11 of the associated spring. Because of the small width in the circumferential direction upon plugging the holder 1 into an opening, a spring 8 gets forced back only a little by the inner face of the opening so that after overriding the rear edge of the opening without being deformed plastically, it springs out again vigorously. The spring thickness preferably amounts to 0.5–1 mm but it may also be chosen thinner or still thicker.

I claim:

1. In a holder for an electrical component and adapted to be fixed by once-only plugging of said holder into an opening in a mounting panel, said holder comprising a housing which has a substantially cylindrical outer face carrying a resilient clamping element with a diameter adapted in use to exceed in part the inner diameter of said opening, and said housing being dimensioned to be pushed through said opening whereupon an edge of said clamping part running obliquely to a generatrix of said cylindrical outer face engages behind said mounting panel; the improvement wherein said clamping part comprises a collar having a plurality of strip springs extending axially along said outer face and terminating at ends at least most of which have oblique edges which are located at different axial positions along said outer face, said strip springs being twisted such that one side edge of a strip spring extends substantially parallel to a generatrix of said cylindrical outer face and the other side edge of said strip spring is displaced outwardly away from said outer face, and said strip springs being arranged in groups with the axial lengths of said strip springs in each group successively decreasing around said outer face.

2. A holder according to claim 1, wherein for each two adjacent strip springs in each group the distal end of said oblique edge of a shorter one of said two adjacent strip springs lies axially beyond the proximal end of said oblique edge of the other longer one of said two adjacent strip springs.

3. A holder according to claim 2, wherein each of said groups consists of at least four of said strip springs.

4. A holder according to claim 2, wherein there are three of said groups on said collar.

5. A holder according to claim 4, wherein the longest one of said strip springs of each of said groups terminates at an end edge extending perpendicularly to side edges of said strip spring.

6. A holder according to claim 2, wherein the slope of said oblique edges of said strip springs in one of said groups increases with decreasing strip spring length.

7. A holder according to claim 1, wherein a gap is provided between side edges of adjacent strip springs.

8. A holder according to claim 1, wherein said end edge of each strip spring and a tangent to the associated outer face generatrix are inclined to one another at an angle of no more than 45%.

9. A self-fastening holder for an electrical component fastenable to any one of a plurality of mounting panels having a thickness within a predetermined range of mounting panel thicknesses, the holder comprising: an elongate housing for holding an electrical component and having a flange portion at one end, said housing being dimensioned to be axially inserted into an opening in the mounting panel in a direction from the front face to the rear face thereof and said flange portion being dimensioned to abut the front face of the mounting panel to thereby determine the axial position of the holder relative to the mounting panel; and resilient clamping means disposed on said housing and insertable therewith into the mounting panel opening for slidably engaging with the wall of the opening at a plurality of circumferentially spaced locations to effectively center the holder in the opening and for resiliently clamping against the rear face of the mounting panel at a plurality of circumferentially spaced locations to effectively fasten the holder to the mounting panel, said resilient clamping means comprising a plurality of groups of strip springs arranged circumferentially around the housing and extending axially thereof, each group having a plurality of strip springs of progressively decreasing axial length and having inclined end portions which are partly twisted outwardly away from said housing so that depending on the thickness of the mounting panel one or two of the inclined and twisted end portions of the strip springs in each group can clamp against the rear face of the mounting panel to fasten the holder to the mounting panel.

10. A holder according to claim 9; wherein the inclined end portions of each two adjoining strip springs in each group overlap each other.

11. A holder according to claim 9; wherein the plurality of groups of strip springs comprise at least three.

12. A holder according to claim 9; wherein the housing has an annular shoulder portion axially spaced from said flange portion, and said resilient clamping means is disposed on said housing between said flange and shoulder portions which effectively prevent axial shifting of the resilient clamping means on the housing.

* * * * *